United States Patent Office 3,330,771
Patented July 11, 1967

3,330,771
PROCESS FOR THE REMOVAL OF WATER-SOLUBLE IONIC RADIOACTIVE WASTE FROM WATER
Tsuyoshi Komatsu, Sapporo, Japan, and Takeshi Okura, deceased, late of Sapporo, Japan, by Midori Okura, widow, Sapporo, Japan, and Sachiko Kayama, Sapporo, Japan, legal representative of Kaede Okura, minor heir, assignors to Nippon Soda Co., Ltd., Tokyo, Japan, a company of Japan
No Drawing. Filed Nov. 30, 1961, Ser. No. 156,565
8 Claims. (Cl. 252—301.1)

This application constitutes a continuation-in-part of our prior application, Ser. No. 51,252, filed Aug. 23, 1960, now abandoned.

This invention relates to techniques for the treatment of radioactive water, in general, and more particularly to an economic process for the removal of radioactive nuclear fission products from water.

Heretofore, many processes have been developed for the removal of radioactive nuclear fission products from aqueous solutions, but all such processes suffer from the disadvantages of being either very expensive, inefficient, or of taking an extraordinary amount of time. Among such processes are the storage and decay method, dilution, and various concentrating methods including evaporation, ion-exchange, and co-precipitation.

In the latter category, precipitation methods have been extensively investigated as a method of separation, decontamination, and recovery of reactor fuel materials. Indeed, the original plutonium separation process set up at Hanford, Washington, developed before anyone had ever seen any plutonium, employed the bismuth phosphate process, which was based on precipitation.

The bismuth phosphate process employs six $BiPO_4$ steps followed by two $LaF_3$ steps and is, needless to say, a complicated hydrometallurgical process.

In general, such processes involve separations of very minute amounts of radioactive materials from a large bulk of substrate. The problem has generally, albeit not satisfactorily, been solved by coprecipitating the trace constituents on a suitable carrier element, which is added in substantial quantities. The presence of a carrier element, even in excess of the trace element's solubility product, has generally been necessary so as to make the amount of precipitate perceptible. Four mechanisms for coprecipitation have been investigated: isomorphous replacement, surface adsorption, anomalous mixed crystals, and internal adsorption. Manganese dioxide and ferric hydroxide have been used extensively as large-surface-area precipitates capable of adsorbing large quantities of trace elements.

The scope of the problem is immense—production factories produce high level liquid wastes at a rate of thousands of gallons daily—and up to the present, the cost of constructing storage tanks has averaged about one dollar per gallon of waste stored. In addition to being expensive, this method is a potential hazard if the tanks should rupture. Flocculation processes have not, as yet, proved satisfactory for processing such materials.

The present invention marks a unique improvement in precipitation methods, and is grounded in the fact that solutions of water-soluble titanium compounds, which by hydrolysis form precipitable titanium hydroxide complexes in solution, have been found to be exceptionally good scavengers of the radioactive fission products commonly found in radioactive waste water. It is to be noted that these compounds are effective even without the traditional carrier elements that are used in conventional precipitation methods. Any and all water-soluble titanium compounds, both inorganic and organic, are suitable for this purpose, including titanium tetrachloride, titanium sulfate, dichloro titanium diacetate, dichloro titanium oxalate, and the like.

The method of treatment according to the present invention is extremely simple, involving only the addition of a solution of the titanium compound to the water to be treated, along with a small quantity of a solution containing a caustic alkali and an alkali sulfate, mixing the additives thoroughly in the waste solution, and separating the coagulated flocculents and precipitated colloids by any convenient method such as centrifugal force, filtration, or settling and decantation of the purified liquid. The concentration of titanium in the original solution may be advantageously set at between 2.5 and 12.5%, and while the amount of such solution used will vary with the concentration of radioactive fission products in the waste water, a quantity sufficient to introduce from 1 to 100 p.p.m. of titanium into the waste water is generally sufficient for most waste products of this class.

The mechanism of the reactions involved in the present invention are in accord with known chemical principles, in that the dissolved radioactive cations along with colloidal radioactive substances can be co-precipitated and removed from solution by action of titanium hydroxide radicals resulting from the hydrolysis of titanium ions in solution. The resulting hydroxide formed has an extremely low solubility and precipitates readily upon agitation.

Previously, hydroxides used for co-precipitation were those of $Fe^{3+}$, $Fe^{2+}$, $Al^{3+}$, $Mn^{2+}$, $Cu^{2+}$, etc., but with the exception of $Fe^{3+}$, these suffer from the defect of requiring a high pH for forming precipitates and also, of the precipitates tending to dissolve in solutions of too high pH. The required pH for forming precipitates of hydroxide of $Ti^{4+}$ is lower than that of $Fe^{3+}$ and the precipitate is negligibly soluble in solutions of up to pH 14.

In the previous methods for precipitating with hydroxides, cation radioisotopes having a valence of three or more were removed easily, but it has been difficult to remove bivalent cation radioisotopes, especially alkaline earth ions such as $^{90}Sr$, etc. This is particularly so in neutral or very weak acidic solutions.

To remove these ions, a higher removal rate is possible only by the use of difficultly-soluble compounds analogous to $Ca^{2+}$, like calcium carbonate and calcium phosphate (believed to be $nCaHPO_4 \cdot mCa(OH)_2$). Also, it is possible to increase the removal rate by using ferric hydroxide to raise the pH of solution, but this, in turn, necessitates use of a large amount of alkali. We have found that titanium hydroxide is better than other hydroxides from the point of view of removing $^{90}Sr$ in neutral or very weak acid solutions.

While it cannot be said that the mechanism of coprecipitation removal by hydroxide is entirely clear, it is believed to be substantially as follows:

Coprecipitation of multi-valent cationic radioisotopes (tri-valent and higher) is based chiefly on the isomorphous replacement and anomalous mixed crystal formation mechanisms and only partially on surface adsorption, but it is believed that coprecipitation of bi-valent, alkaline cations is due chiefly to surface adsorption.

It is generally believed that the hydroxide is a multivalent complex salt comprising a cation and an $OH^-$ ion and that it can be assumed that it forms a high molecular weight electrolyte (either acid or base) with different ratios of cation and $OH^-$ possible as shown by pH. It is therefore possible to adsorb (couple) both cations or anions. When the alkali is neutralized with an acidic solution such as in the case of $Al^{3+}$, an aluminum complex salt $(Al(OH)_5OH)^{2+}$, this reacts with $OH^-$ to form $(Al(OH_2)_4(OH_2))^+$, and then polymerizes by coordinate bond formation among single-nucleus complex ions to produce a multi-nuclei complex salt such as

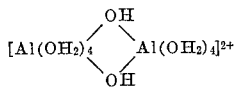

Finally, the degree of polymerization advances to form a precipitate of very large and high molecular weight electrolyte. In a weak acidic solution, however, where pH is not very high, it is present as a colloidal cation with only a low degree of polymerization, and a precipitate will not be formed. If pH is appropriate (in Al, from 7–8), almost no electric charge will result and colloidal particles will easily precipitate. But where pH deviates from the isoelectric point (a colloid ion will become a cation at pH below isoelectric point and become an anion at pH above isoelectric point), it will be necessary to form a difficultly soluble salt of a colloid ion and, for this purpose, addition of $Ca^{2+}$ as a cation or $SO_4^{2-}$ as an anion etc. will be necessary. For this reason, $Na_2SO_4$ is added in the examples set forth below.

This $SO_4^{2-}$ can be considered as an aggregation assistant equivalent to active (colloidal) silica in the conventional aggregation-precipitation treatment method, i.e. in neutralizing the charge and accelerating precipitation.

It is believed that the mechanism of radioisotope precipitation by titanium hydroxide is roughly the same as set forth above, but it can be said that the special feature of this invention is that the adsorptive power of titanium hydroxide is greater than those of other hydroxides.

Furthermore, in previous coprecipitation treatment processes using $FeSO_4$, $Fe_2(SO_4)_3$, $Al(SO_4)_3$ etc., it is believed that the necessity of adding $SO_4^{2-}$ was overlooked as $Ca^{2+}$ and $SO_4^{2-}$ were generally present in the waste water being treated. It should be noted that $Ti^{4+}$ can be present, dissolved as a coordinate coupled complex salt with $Cl^-$ or $SO_4^{2-}$ in aqueous solution, but only a minute quantity is dissolved in $HNO_3$, $HClO_4$, etc. as $(Ti(OH)_2)^{2+}$.

Titanium hydroxide is precipitated at a pH of about one when highly concentrated, and is precipitated more easily by heating. In the examples set forth below, a hydrochloric acid solution of titanium tetrachloride was prepared in order to prevent precipitate formation by heat generation. The $TiCl_4$ can be dissolved directly in ice-cooled water to make a very dilute solution, and heat formation can be disregarded.

It has been suggested by certain prior workers in the field that the coagulating power of cations increases with valence and qualitatively follows the Hardy-Schulze rule. As is obvious from the foregoing, the present invention admits of no such simple explanation as the titanium present in the solution is in the form of $[Ti(OH)_2]^{2+}$, or, in very acid solutions, as $[TiCl_6]^{2-}$. Of course it would hardly be possible for $Ti^{4+}$ to coagulate either $^{89}Sr^{2+}$ or $^{90}Sr^{2+}$, as both are cations. However, when the titanium is present as the salt of a multi-nuclei hydroxo complex anion, as postulated above, a highly efficient and selective coprecipitation of the radioisotopes results.

It is believed that a clearer understanding of the process of the present invention will be gained by referring to the following examples of specific embodiments thereof, which include examples of precipitation using the more conventional $Fe_2(SO_4)_3$ and $Al_2(SO_4)_3$ reagents, and which clearly show the unexpected and unique improvements to be gained by using water soluble titanium compounds in this capacity.

Example I

An aqueous solution containing radioactive fission products ($^{137}Cs$–$^{137m}Ba$, $^{90}Y$, $^{144}Ce$, $^{144}Pr$, $^{144}PM$, $^{106}Ru$–$^{106}Rh$) of $2.29 \times 10^5$ counts per minute per liter (=c.p.m./l.) (approximately 1.2 microcuries per liter) activity which had been cooling for about five years so as to make it N/1000 was treated with an acid solution of titanium tetrachloride and $Na_2SO_4$. It was then neutralized by adding a quantity of 0.2 N NaOH, and the solution was allowed to stand for two hours to allow precipitation to proceed. Separation was then effected with the use of centrifugal force by rotation at $10^4$ r.p.m., and a small portion of the supernatant liquid was transferred to a test dish, allowed to evaporate, and the residual radioactivity was measured with a GM counter.

In parallel with the above experiments, similar tests were made using $Fe_2(SO_4)_3$ and $Al_2(SO_4)_3$ on solutions of the same concentration and age, along with N/1000 NaCl for coexistent electrolysis.

Results are shown in Table I.

TABLE I.—REMOVAL PERCENTAGES

| Elements | Concentration, p.p.m. | pH | Less than 1 hour | 4 days | 19 days | 37 days |
|---|---|---|---|---|---|---|
| $Ti^{4+}$ | 12.0 | 6.8 | 72.7 | 72.4 | 72.1 | 72.1 |
| $Fe^{3+}$ | 18.6 | 6.95 | 59.3 | 40.1 | 34.3 | 30.9 |
| $Al^{3+}$ | 9.0 | 7.0 | 55.4 | 32.3 | 30.5 | 26.1 |

When $Fe^{3+}$ or $Al^{3+}$ was used as the treating agent, $^{90}Y$ was removed but its fission progenitor $^{90}Sr$, was not removed, resulting in a lowering of the removal percentage to around 30%, due to the later formation of highly radioactive $^{90}Y$ by spontaneous decay of the strontium isotope. On the other hand, when $Ti^{4+}$ was used as the treating agent, the removal percentage was of the order of 70%, and the $^{90}Sr$ was completely removed. It is believed that what residual radioactivity there was in this test came from $^{137}Cs-$ and $^{137}Ba$. It was noted that the radioactivity of $^{90}Y$ reached an equilibrium in about 20 days and remained constant thereafter.

Example II

A carrier-free $^{89}SrCl_2$ solution containing $^{90}Sr-^{90}Y$, and $^{89}Sr$ of $2.02 \times 10^5$ counts per minute per liter (=c.p.m./l.) (approximately 1.15 microcuries per liter) activity and being about nine months old was treated under the same conditions as described heretofore in Example I, and the results shown in Table II were obtained.

TABLE II.—PERCENTAGE REMOVAL

| Elements Used | Concentration, p.p.m. | pH | Less than 1 hour | 2 days | 23 days | 24 days |
|---|---|---|---|---|---|---|
| $Ti^{4+}$ | 12.0 | 6.8 | 72.8 | 67.0 | 63.5 | |
| $Ti^{4+}$ | 12.0 | 7.0 | 55.6 | 56.0 | | 66.2 |
| $Fe^{3+}$ | 18.6 | 5.4 | 36.2 | 18.7 | | 4.9 |
| $Fe^{3+}$ | 18.6 | 7.15 | 48.0 | 35.0 | | 17.7 |
| $Al^{3+}$ | 9.0 | 6.1 | 33.7 | 13.7 | | 3.1 |
| $Al^{3+}$ | 9.0 | 7.6 | 61.0 | 48.9 | | 30.8 |

Again, use of the $Fe^{3+}$ or $Al^{3+}$ reagents resulted in the coprecipitation of $^{90}Y$ but little precipitation of $^{90}Sr$, resulting in the regeneration of $^{90}Y$ by decay of the strontium and reduction of the removal percentage. With the use of $Ti^{4+}$ however, the $^{90}Sr$ was also coprecipitated and the removal percentage was maintained over 60% after an extended period of time. The removal percentage of the hydroxide precipitate after aging for five days was 83% with $Ti^{4+}$ (in which pH was 6.8) and 48% with $Al^{3+}$ (in which pH was 7.6) and the percentage removal of their radioactivities 20 days thereafter was 86% and 36%, respectively.

Having thus described the subject matter of our invention, what it is desired to secure by Letters Patent is:

1. Process for the removal of water-soluble ionic radioactive waste from water that comprises mixing small quantities of a water soluble tetravalent titanium compound, a caustic alkali, and an alkali sulfate to said water forming thereby multi-nucleic hydroxo complex anions with said water, allowing time for collection of said water-soluble ionic radioactive waste by said complex anions and precipitation thereof, and separating said decontaminated water from said complex anions and collected radioactive waste.

2. Process for the removal of water-soluble ionic radioactive waste from water that comprises mixing with said water small quantities of a caustic alkali, an alkali sulfate, and a water-soluble tetravalent titanium compound selected from the group consisting of titanium tetrachloride, titanium sulfate, dichloro titanium diacetate, and dichloro titanium oxalate forming thereby multi-nucleic hydroxo complex anions with said water, allowing time for collection of said water-soluble ionic radioactive waste by said complex anions precipitation thereof, and separating said decontaminated water from said complex anions and collected radioactive waste.

3. The process as claimed in claim 2, wherein said added titanium compound is present in said water in a concentration of from approximately one (1) to one-hundred (100) parts per million of contained titanium.

4. The process as claimed in claim 2, wherein said titanium compound is added to said water in the form of an aqueous solution containing from approximately two and one-half (2.5) percent to twelve and one-half (12.5) percent of contained titanium.

5. Process for the removal of water-soluble radioactive, bivalent cations from water that comprises mixing with said water small quantities of a caustic alkali, an alkali sulfate, and a water-soluble tetravalent titanium compound selected from the group consisting of titanium tetrachloride, titanium sulfate, dichloro titanium diacetate, and dichloro titanium oxalate, forming thereby multi-nucleic hydroxo complex anions in said water,
allowing time for the surface adsorption and collection of said water-soluble radioactive cations by said complex anions and precipitation thereof, and
separating said decontaminated water from said complex anions and radioactive cations.

6. The process as claimed in claim 5, wherein said added titanium compound is present in said water in a concentration of from approximately one (1) to one-hundred (100) parts per million of contained titanium.

7. The process as claimed in claim 5, wherein said titanium compound is added to said water in the form of an aqueous solution containing from approximately two and one-half (2.5) percent to twelve and one-half (12.5) percent of contained titanium.

8. Process for the removal of water-soluble radioactive $^{90}$Sr and $^{90}$Y (strontium 90 and yttrium 90) cations from water that comprises,
mixing with said water small quantities of a caustic alkali, an alkali sulfate, and from approximately one (1) to one-hundred (100) parts per million of titanium in the form of a water-soluble tetravalent titanium compound from the group consisting of titanium tetrachloride, titanium sulfate, dichloro titanium diacetate, and dichloro titanium oxalate, forming thereby multi-nucleic hydroxo complex anions in said water,
allowing time for the surface adsorption and collection of said water-soluble radioactive cations by said complex anions and precipitation thereof, and
separating said decontaminated water from said complex anions and radioactive cations.

References Cited
UNITED STATES PATENTS

| | | | |
|---|---|---|---|
| 1,173,698 | 2/1916 | Block | 210—51 |
| 2,204,812 | 6/1940 | Muskat | 252—326 |
| 2,269,402 | 1/1942 | Swackhamer | 210—54 X |

FOREIGN PATENTS

| | | |
|---|---|---|
| 766,455 | 4/1934 | France. |
| 561,781 | 6/1944 | Great Britain. |

OTHER REFERENCES

Burbank et al.: "A Study of the Removal of Radioactive Particulate Matter From Water by Coagulation," published by the Atomic Energy Commission, Report No. NYO-4440, Sept. 1, 1955, pages 6–9.

MORRIS O. WOLK, *Primary Examiner.*

EARL M. BERGERT, W. B. WALKER, M. E. ROGERS,
*Assistant Examiners.*